United States Patent Office 2,870,212
Patented Jan. 20, 1959

2,870,212

METHOD FOR THE PRODUCTION OF DICARBONYLPOLYENES

Herbert Lindlar, Reinach, Basel-Land, and Marc Montavon and Rudolf Rüegg, Basel, Switzerland, assignors to Hoffmann-La Roche Inc., Nutley, N. J., a corporation of New Jersey No Drawing. Application March 22, 1957
Serial No. 647,738

Claims priority, application Switzerland April 4, 1956

12 Claims. (Cl. 260—593)

This invention relates to a new method for the production of dicarbonylpolyenes, i. e. unsaturated aldehydes and ketones. More particularly, the invention relates to the production of poly-unsaturated aliphatic dialdehydes and diketones.

The process of this invention comprises reacting an alkali salt of a nitronic acid with a dihalogenated hydrocarbon containing at least three multiple carbon to carbon bonds and wherein there is a double bond in the $\alpha,\beta$-position with respect to each halogen. The reaction may be carried out in the presence of anhydrous or aqueous diluents for example a mono- or polyhydroxy alcohol such as methanol, ethanol, isopropanol, tertiary butanol, mono- and diethylene glycol, a water-soluble ether such as diethylene glycol-ethyl butyl ether, dioxane, tetrahydrofuran, a dialkyl amide such as dimethylformamide, an acetal such as methylal, a ketone such as acetone, acetonitrile, etc. The reactants are mixed in the diluent at a temperature between —10° and 40° C., preferably 0°–30° C.

The nitronic acids are primary or secondary nitro compounds which convert to the aci-form and react with alkalis such as alkali metal hydroxides or alcoholates to form alkali salts. Alkali salts of lower aliphatic nitronic acids such as methane-, propane-1- or propane-2-nitronic acid and alicyclic nitronic acids such as cyclohexane nitronic acid are preferred. These salts may be produced by reacting a nitro compound such as nitropropane with an alkali compound, preferably an alkali metal compound such as sodium or potassium hydroxide or sodium or potassium alcoholate.

The unsaturated dihalogenated hydrocarbons which may be converted to aldehydes or ketones by the present process are preferably polyunsaturated dihalogenated aliphatic hydrocarbons wherein one halogen atom is attached to each terminal carbon atom of the hydrocarbon chain or to the carbon atom next to the terminal carbon atom. Preferred halogens are chlorine and bromine. Dihalogenated hydrocarbons which may be used as starting materials in the process include, for example, 1,8-dichloro-2,4,6-octatriene, 1,8-dibromo-2,6-octadiene-4-yne, 2,9-dichloro-3,7-decadien-5-yne, 2,9-dibromo-3,5,7-decatriene, 1,9-dichloro-2,7-decadien-5-yne, 1,8-dichloro-2,7-dimethyl-2,4,6-octatriene, 1,8-dibromo-2,7-dimethyl-2,6-octadien-4-yne, 2,9-dichloro-3,8-dimethyl-3,7-decadien-5-yne, 2,9-dibromo-3,8-dimethyl-3,5,7-decatriene and 1,10-dichloro-2,7,8-trimethyl-2,6,8-decatrien-4-yne. While not limited thereto, dihalo hydrocarbons containing 8 to 13 carbon atoms constitute a preferred group. Especially preferred starting materials are dihalogenated hydrocarbons wherein the hydrocarbon chain contains conjugated carbon to carbon multiple bonds in a terpene-like structure and contains a central triple bond which divides the molecule into two halves which are mirror images, for example, 1,8-dihalo-2,7-dimethyl-2,6-octadien-4-yne, 2,9-dihalo-3,8-dimethyl-3,7-decadien-5-yne, 1,16-dihalo-2,6,11,15-tetramethyl-2,4,6,10,12,14-hexadecahexaen-8-yne, etc.

The foregoing dihalohydrocarbons may be obtained by halogenating the corresponding diols with a phosphorus trihalide or a hydrohalic acid in an inert solvent. They may also be obtained from isomeric diols by halogenation and allyl rearrangement. Thus 1,8-dihalo-2,7-dimethyl-2,6-octadien-4-yne may be obtained from 1,8-dihydroxy-2,7-dimethyl-2,6-octadien-4-yne or 2,7-dimethyl-3,6-dihydroxy-1,7-octadien-4-yne and 2,9-dihalo-3,8-dimethyl-3,7-decadien-5-yne may be obtained from 2,9-dihydroxy-3,8-dimethyl-3,7-decadien-5-yne or 3,8-dimethyl-4,7-dihydroxy-2,8-decadien-5-yne.

According to a preferred embodiment of the invention, a solution or suspension of anhydrous or aqueous sodium or potassium hydroxide solution in a diluent is treated with the nitro compound, for example 2-nitropropane. The solution or suspension of the sodium or potassium salt of the nitronic acid thus obtained is added gradually to the dihalohydrocarbon and the mixture is stirred at 0° to 30° C. It is also possible to reverse the sequence by introducing the dihalohydrocarbon gradually into the solution or suspension of the alkali salt of the nitronic acid and stirring the mixture at 0° to 30° C.

According to another preferred embodiment, the nitro compound is treated with a solution of an alkali alcoholate, such as potassium tertiary butylate in tertiary butanol, and the solution or suspension of the alkali salt of the nitronic acid thus obtained is mixed with the dihalohydrocarbon at 20° to 30° C.

Depending upon the alkali salt and the diluent used, the reaction solution either becomes homogeneous or separates into two layers. In the latter case, it is preferable to produce an intimate admixture of both phases by intensive agitation.

The unsaturated aldehydes and ketones obtained by the process of this invention are useful as coloring agents, particularly for coloring foodstuffs, or may be used to produce other compounds such as $\beta$-carotene, lycopene, etc. which are coloring agents for foodstuffs.

The following examples are illustrative of the invention. All temperatures are in degrees centigrade.

*Example 1*

840 parts by weight of 2-nitropropane were added gradually to a solution of 348 parts by weight of sodium hydroxide in 1200 parts by volume of methanol and 350 parts by volume of water while stirring and cooling so that the temperature did not exceed 10°. The mixture was then stirred an additional 60 minutes at 5°–10°. The solution thus obtained was added to a well mixed suspension of 1060 parts by weight of 1,8-dibromo-2,7-dimethyl-2,6-octadien-4-yne in 4200 parts by volume of methanol over the course of one to two hours at 4°–8° and the mixture was stirred for an additional 5 hours at the same temperature. The reaction mixture was poured into 2000 parts by volume of ice water and extracted twice, each time with 2000 parts by volume of benzene.

The benzene solutions were washed in sequence twice with ice cold dilute sodium hydroxide solution, with ice cold dilute sulfuric acid and with dilute sodium bicarbonate solution. The solvent was distilled off in vacuo. For purification, the residue was crystallized from isopropanol to obtain 2,7-dimethyl-2,6-octadien-4-yne-1,8-dial in the form of yellow crystals, M. P. 68–69°; U. V. absorption maxima at 310 and 330 m$\mu$;

$E_1^1 = 1940$ and 2030 (in petroleum ether)

*Example 2*

According to the procedure described in Example 1, 170 parts by weight of 2-nitropropane were introduced into a solution of 100 parts by weight of potassium hydroxide in 250 parts by volume of ethanol and 100 parts of volume of water and treated with 225 parts by weight of 1,8-dibromo-2,7-dimethyl-2,6-octadien-4-yne in 800 parts by volume of ethanol. The 2,7-dimethyl-2,6-octadien-4-yne-1,8-dial was worked up and crystallized as described in Example 1, M. P. 68–69°.

Example 3

To a mixture of 10 parts by weight of potassium hydroxide in 10 parts by volume of water and 25 parts by volume of dimethyl-formamide were gradually added with stirring 17.2 parts by weight of 2-nitropropane at 15°–25°. The mixture was stirred for one hour at room temperature and diluted with 100 parts by volume of dimethylformamide. Then 22 parts by weight of 1,8-dibromo-2,7-dimethyl-2,6-octadien-4-yne were introduced portionwise so that the temperature did not exceed 35°. The mixture was then stirred an additional 4 hours at 25°, poured into ice water and worked up as described in Example 1 to obtain 2,7-dimethyl-2,6-octadien-4-yne-1,8-dial.

Example 4

2 mols of tiglic aldehyde were condensed with one mol of acetylene dimagnesium bromide in ether at 25° and the 3,8-dimethyl-4,7-dihydroxy-2,8-decadien-5-yne, M. P. 67°–68°, thus obtained was brominated with the calculated amount of phosphorous tribromide in ether at 0°. The crude crystalline 2,9-dibromo-3,8-dimethyl-3,7-decadien-5-yne thus obtained was used without further purification.

A suspension of 108 parts by weight of potassium hydroxide in 1300 parts by volume of acetone was treated with 54 parts by volume of water and 177 parts by weight of 2-nitropropane and vigorously stirred until complete conversion occurred (1 to 2 hours). 260 parts by weight of 2,9-dibromo-3,8-dimethyl-3,7-decadien-5-yne were then added portionwise. The temperature was maintained between 25° and 30° by occasional cooling. The mixture was stirred for an additional 16 hours at 25°–30°. 1900 parts by volume of water were then added gradually. The crystals were filtered under suction. The product was dried in vacuo and recrystallized from methanol to obtain 3,8-dimethyl-2,9-dioxo-3,7-decadien-5-yne as yellow needles, M. P. 108–109°; U. V. maximum at $\mu$ 309 and 329 m$\mu$;

$E_1^1 = 1540$ and $1490$ (in petroleum ether)

Example 5

108 parts by weight of potassium hydroxide were vigorously stirred with 1200 parts by volume of isopropanol and 177 parts by weight of 2-nitropropane until complete conversion occurred (about 3 hours). 260 parts by weight of 2,9-dibromo-3,8-dimethyl-3,7-decadien-5-yne were then added portionwise and the temperature was held between 25° and 30° by occasional cooling. The mixture was stirred for an additional 16 hours at 25°–30° and the reaction product was precipitated by the gradual addition of water. The crystals of 3,8-dimethyl-2,9-dioxo-3,7-decadien-5-yne obtained were dried in vacuo and purified by recrystallization from methanol, M. P. 108°–109°.

Example 6

108 parts by weight of potassium hydroxide in 1300 parts by volume of dimethylformamide were vigorously mixed with 54 parts by volume of water and 177 parts by weight of 2-nitropropane until complete reaction occurred. Then, according to the procedure described in Example 4, the mixture was treated with 260 parts by weight of 2,9-dibromo-3,8-dimethyl-3,7-decadien-5-yne and worked up to obtain 3,8-dimethyl-2,9-dioxo-3,7-decadien-5-yne, M. P. 108°–109°.

Example 7

2 mols of tiglic aldehyde were condensed with 1 mol of acetylene dimagnesium bromide in ether at 25°. The 3,8-dimethyl-4,7-dihydroxy-2,8-decadien-5-yne, M. P. 67°–68°, thus obtained was treated with dilute sulfuric acid in acetone at 25°. The 3,8-dimethyl-2,9-dihydroxy-3,7-decadien-5-yne (U. V. maxima at 273 and 288 m$\mu$ in petroleum ether) obtained was chlorinated with the calculated amount of phosphorus trichloride in ether at 0°.

108 parts by weight of potassium hydroxide in 1300 parts by volume of dimethylformamide were vigorously mixed with 54 parts by volume of water and 177 parts by weight of 2-nitropropane until complete reaction occurred. Then, according to the procedure described in Example 4, the mixture was treated with 187 parts by weight of 2,9-dichloro-3,8-dimethyl-3,7-decadien-5-yne and worked up to obtain 3,8-dimethyl-2,9-dioxo-3,7-decadien-5-yne, M. P. 108°–109°.

We claim:

1. A process for the production of dicarbonylpolyenes which comprises reacting an alkali metal salt of a nitronic acid selected from the group consisting of lower aliphatic nitronic acid and alicyclic nitronic acid with a dihalogenated aliphatic hydrocarbon containing at least three multiple bonds and wherein there is a double bond in the $\alpha,\beta$-position to each halogen.

2. A process for the production of polyunsaturated aliphatic dialdehydes and diketones which comprises reacting an alkali metal salt of a nitronic acid selected from the group consisting of lower aliphatic nitronic acid and alicyclic nitronic acid, with a dihalogenated aliphatic hydrocarbon containing at least three multiple carbon to carbon bonds and wherein there is a double bond in the $\alpha,\beta$-position to each halogen, in an inert organic diluent at a temperature between $-10°$ and 40° C.

3. A process as in claim 2 wherein the hydrocarbon has conjugated double bonds.

4. A process as in claim 2 wherein the hydrocarbon has a central triple bond and conjugated double bonds.

5. A process which comprises reacting an alkali metal salt of a lower aliphatic nitronic acid with a dihalogenated aliphatic hydrocarbon containing at least three multiple carbon to carbon bonds and wherein there is a double bond in the $\alpha,\beta$-position to each halogen in an inert organic diluent at a temperature between $-10°$ and 40° C.

6. A process which comprises reacting 1,8-dihalo-2,7-dimethyl-2,6-octadien-4-yne with an alkali metal salt of a lower aliphatic nitronic acid at a temperature between 0° and 30° C.

7. A process which comprises reacting 1,8-dibromo-2,7-dimethyl-2,6-octadien-4-yne with the sodium salt of propane-2-nitronic acid in an inert organic diluent at 0° to 30° C.

8. A process as in claim 7 wherein the diluent is methanol.

9. A process which comprises reacting 2,9-dibromo-3,8-dimethyl-3,7-decadien-5-yne with the potassium salt of propane-2-nitronic acid in an inert organic diluent at 0° to 30° C.

10. A process which comprises reacting 2,9-dichloro-3,8-dimethyl-3,7-decadien-5-yne with the potassium salt of propane-2-nitronic acid in an inert organic diluent at 0° to 30° C.

11. A process as in claim 10 wherein the diluent is dimethylformamide.

12. A process which comprises reacting potassium hydroxide with 2-nitropropane and reacting the product with 1,8-dibromo-2,7-dimethyl-2,6-octadien-4-yne at 0° to 30° C.

References Cited in the file of this patent

UNITED STATES PATENTS 2,267,375    Johnson _____ Dec. 23, 1941

OTHER REFERENCES

Gotting: Ber. Deut. Chem., vol. 21 (IV) (References), pp. 58–9 (1888).